United States Patent Office 3,379,187
Patented Apr. 23, 1968

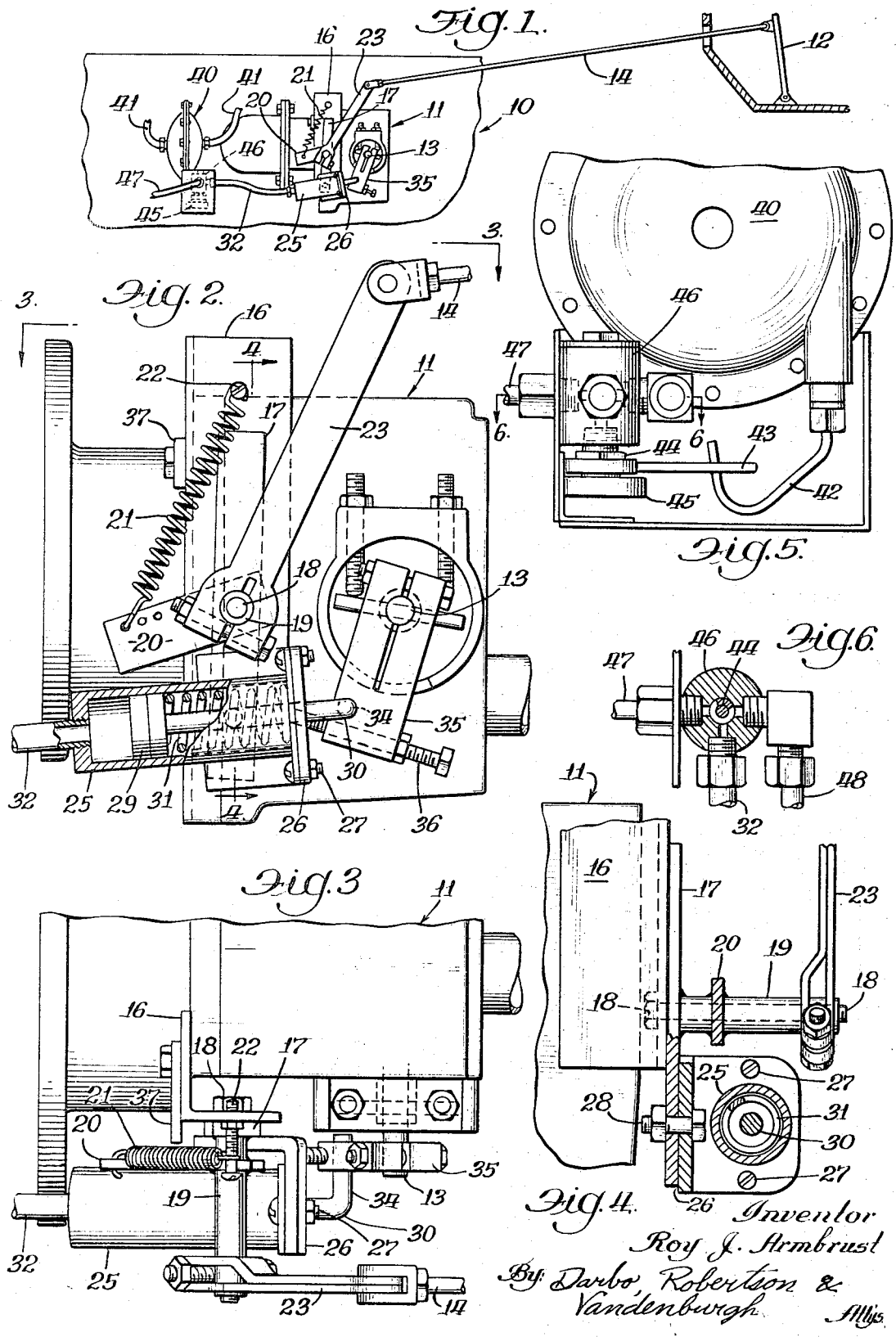

3,379,187
DIESEL SAFETY CONTROL APPARATUS
Roy J. Armbrust, 28501 Oaklawn, Glen Ellyn, Ill. 60137
Filed May 5, 1966, Ser. No. 547,835
3 Claims. (Cl. 123—198)

The present invention relates to an apparatus for preventing the operation of an internal combustion engine in a manner which would be likely to damage the same in the event of a malfunction in the oil lubricating system and/or in the cooling system, and the following disclosure thereof is offered for public dissemination upon the grant of a patent therefor.

While the present invention can be employed in conjunction with all types of internal combustion engines, it is particularly applicable to the diesel engine. In many of the modern diesel engines, it is necessary to supplement the removal of excess heat, primarily performed by the water coolant system, by utilizing in addition thereto a lubricating oil coolant system. Thus, the oil employed for the normal lubrication of the bearings etc., additionally is sprayed on the pistons to maintain the temperature thereof in a safe working range. Provision is made for the constant removal and cooling of this lubricating oil. Should an inadequate amount of the cooled oil be sprayed upon the pistons, the pistons are likely to become unduly heated and expand to an extent such that they will freeze in the cylinders. With such engines, the necessity for maintaining adequate oil circulation is more critical than in the average internal combustion engine wherein the oil is employed solely for lubrication purposes. With a diesel engine of the type described, a reduced oil flow condition can result in engine damage due to overheating, even though the oil flow still remains adequate for normal lubrication purposes.

The principle object of the present invention is the provision of a safety control apparatus which will permit the engine to be operated even with inadequate oil flow, yet which will reduce the maximum speed at which the engine can be operated to a maximum that is safe to prevent undue damage to the engine, taking into consideration the extent of the oil flow that is present. Thus, with the present invention, the engine can be started or operated at slow speed even with an impaired oil flow. This would, for example, permit a truck to move off the highway to a place of safety even though there were an impaired oil flow, but would prevent such operation from being performed at a speed at which there would be likely damage to the engine. If the oil flow is impaired only slightly, the maximum speed of operation correspondingly is reduced only slightly. Yet, with greater impairments in oil flow, there are greater reductions in the maximum speed at which the engine may be operated. The control apparatus of the present invention also includes means to control the maximum speed should there be an impairment in the circulation of the normal water coolant system.

A further advantage of the invention is that embodiments thereof are comparatively inexpensive, particularly in view of the value of the engine that they are protecting. Furthermore, they may be quickly and easily added to existing engines, special engine designs not being required to incorporate embodiments of the invention.

Further objects and advantages of the invention will be apparent from the following description taken in conjunction with the drawings in which:

FIGURE 1 is a side elevation of a portion of an internal combustion engine showing an embodiment of the invention being mounted on the governor of that engine;

FIGURE 2 is an enlarged view of a portion of the governor with the embodiment mounted thereon, and with portions broken away;

FIGURE 3 is a partial plan view of the apparatus depicted in FIGURE 2 as seen at line 3—3 of FIGURE 2;

FIGURE 4 is a partial section as viewed at line 4—4 of FIGURE 2;

FIGURE 5 is an enlarged view of the coolant system protective portion of the control of the embodiment of FIGURE 1; and FIGURE 6 is a section as viewed at line 6—6 of FIGURE 5.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

FIGURE 1 illustrates a portion of a diesel engine generally 10. The speed of this engine is controlled through a governor generally 11 by the actuation of a throttle such as foot throttle 12. Conventionally, an arm (similar to arm 23 hereinafter described) is secured to shaft 13 of governor 11 and is connected by a linkage, such as rod 14 to throttle 12 to control the speed of operation of engine 10.

In the illustrated embodiment an angle iron 16 is secured to governor 11 to serve as a mounting frame. A moveable member 17 is pivotally mounted on a pin 18, secured to angle iron 16. A sleeve 19 is secured to moveable member 17 and likewise is pivotable on pin 18. An arm 20 secured to sleeve 19 is urged in a clockwise direction, as seen in FIGURE 2, by means of a spring 21 engaging the arm and a pin 22 on frame 16. Arm 23 is adjustably secured to sleeve 19. Actually, arm 23 is the arm that originally had been used on shaft 13 of the governor before the present embodiment was added.

Hydraulic cylinder 25 is secured to angle bracket 26 by means of bolts 27. In turn, angle bracket 26 is pivotally attached to moveable member 17 by means of bolt 28. Cylinder 25 has a piston 29 with a piston rod 30. A spring 31 urges piston 29 towards the closed end of the cylinder. A pipe 32 communicates with the cylinder at its closed end.

Piston rod 30 has an end 34 turned at right angles to the main portion of the piston rod 30 and is pivotally received in a suitably sized opening in arm 35. Arm 35 is secured to shaft 13 of governor 11. It has an adjustable stopbolt 36 thereon. The extent to which moveable member 17 can pivot in a counterclockwise direction is limited by stop 37 positioned in the path of the upper end of arm 17.

A diaphragm type coolant flow sensing device generally 40 is connected to the coolant system by means of hoses 41. This device is of the type disclosed and claimed in my prior patent, No. 3,007,461. It is so constructed and arranged that with a proper flow of coolant, rod 42 is pivoted in one direction, i.e., toward the viewer as seen in FIGURE 5. When the coolant flow is not as it should be with a running engine, the rod 42 assumes the position illustrated in FIGURE 5. Rod 42 is positioned to move arm 43 connected to valve rotor 44 as rod 42 moves to the "safe" position occupied when the coolant flow is adequate. Rotor 44 and arm 43 are urged in the opposite direction by a coil spring 45.

As best seen in FIGURE 6, valve body 46 within which valve rotor 44 is received has three fluid connections. One communicates with pipe 32; the second communicates with pipe 47 leading to the lubricating oil supply line and the third connects to pipe line 48 leading to the lubricating oil return, or reservoir, line.

When the arm 43, and rod 42, are in the position illustrated in FIGURE 5 and representing little or no (inadequate) coolant flow in the system, as detected by coolant flow device 40, the valve rotor 44 is in the position illustrated in FIGURE 6. In this position of the valve rotor, all of pipes 32, 47, and 48 are in communication with each other. When rod 42 turns arm 43 and rotor 44 to the position indicating adequate coolant flow in the engine, as detected by sensing device, the rotor 44, as viewed in FIGURE 6, turns clockwise to a position at which the opening communicating with pipe 48 is obstructed. Pipes 47 and 32 remain in communication with each other.

Thus, if there is inadequate coolant flow, no oil will flow through pipe 32 towards cylinder 25 and any oil under pressure in cylinder 25 is relieved by flowing from pipe 32 to pipe 48. Piston 29 assumes the position illustrated. However, if there is adequate cooling flow, the drain pipe 48 is blocked off so that the oil under pressure from pipe 47 enters pipe 32 to force piston 29 to the right in FIGURE 2 against the compression of spring 31.

The linkages are adjusted so that with throttle 12 pushed all the way down and piston 29 in the fully retracted position in cylinder 25, the governor shaft 13 is turned just sufficiently to permit the starting of motor 10 and to cause motor 10 to run at a fast idle. This would permit a truck, for example, to move over the road at two or three miles an hour which would be sufficiently slow to prevent undue damage, yet would enable it to move.

If the oil pressure is adequate (reflected to the apparatus through pipe 47) and pipe 48 is blocked off as previously described (indicating adequate coolant flow), the oil in cylinder 25 forces piston 29 to the right, a distance such that the setting of governor shaft 13 corresponds to the normal position (whatever it may be) of throttle 12. However, should there be oil pressure in line 47, but less pressure than should be present, spring 31 will force piston 29 partially to the left in FIGURE 2. Unless the oil pressure is completely inadequate, the piston 29 will not return toward the closed end of cylinder 25 as far as the apparatus will permit. In such an intermediate position of piston 29 in cylinder 25, engine 10 will run somewhat slower for any setting of throttle 12 than should be the case under normal conditions. This will permit engine 10 to be used commensurate with its capabilities without the possibility of damage to it. Due to the slowness of the engine as compared to the throttle setting, the operator will be warned that there is trouble but he will not necessarily have to shut the engine down unless he so desires. The lower the oil pressure in pipe 47, the more closely will piston 29 approach the end of its stroke at the closed end of cylinder 25 and the slower will the engine run for any given setting of throttle 12. Conversely, the higher the oil pressure in pipe 47, the greater will be the separation between moveable member 17 and arm 35, thus increasing the speed of motor 10 for any given setting of throttle 12.

I claim:

1. A protective device for an internal combustion engine having a pressurized oil lubricating apparatus with a feed and a drain, a forced circulation cooling system and a speed control apparatus with a moveable member effective to regulate the speed of the engine, said device comprising: hydraulic responsive means for connection to said lubricating apparatus, said means having a part moveable through a range of positions in response to the variance in pressure of the lubricating oil apparatus through a range of pressure; detection means for connection to said cooling system and having a portion moveable from an unacceptable position to an acceptable position when the force is adequate to produce satisfactory circulation; a control valve moveable between two positions and operatively connected to said portion to be moved to said positions respectively corresponding to said two positions of said portion, said valve having a hydraulic responsive means connection for connection to said hydraulic responsive means, a feed connection for connection to said lubricating apparatus and a drain connection, communication being established through the valve between the feed and hydraulic responsive means connection when said portion is in the acceptable position and when the portion is in the unacceptable position communication therebetween being blocked; and means connecting said moveable member and said part for adjusting said speed control apparatus to reduce the speed of said engine without stopping the engine, below the speed demanded thereof as the oil pressure drops below a normal value, with the speed reduction reflecting the extent to which the oil pressure is below said normal; whereby with inadequate oil pressure the speed at which the engine may be operated is reduced, yet the engine may be started and operated at a slow speed and when unsatisfactory circulation is indicated by the detection means the oil flow to the hydraulic responsive means is blocked and the engine is likewise slowed down.

2. A device as set forth in claim 1 for use with an engine wherein said moveable member is controlled by a throttle member through a mechanical linkage, said part being a part of said linkage and being so arranged that for a given setting of the throttle member the moveable member is advanced farther in the speed increasing direction with high oil pressure at said hydraulic responsive means than with low oil pressure thereat.

3. A device as set forth in claim 2, wherein said hydraulic responsive means includes a cylinder portion and a piston rod portion moveable with respect to the cylinder portion, a fixed mounting, a moveable mounting pivotally secured with respect to the fixed mounting, one of said portions being secured to said moveable mounting for movement therewith, the other portion being connected to one of said members, the other member being connected to said moveable mounting.

References Cited

UNITED STATES PATENTS

| 1,265,813 | 5/1918 | Pharo | 137—28 |
| 2,201,123 | 5/1940 | Davis | 123—198 |
| 2,260,576 | 10/1941 | Maybach | 123—102 |
| 2,645,474 | 7/1953 | Barnes | 137—28 X |
| 3,007,538 | 11/1961 | Hill | 123—102 |
| 3,289,659 | 12/1966 | Koole | 123—103 X |
| 3,301,245 | 1/1967 | Woodburn | 123—198 |

FOREIGN PATENTS

| 899,583 | 8/1944 | France. |
| 657,304 | 9/1951 | Great Britain. |
| 734,009 | 7/1955 | Great Britain. |

WENDELL E. BURNS, *Primary Examiner.*